(12) United States Patent
Jackson et al.

(10) Patent No.: US 6,443,281 B2
(45) Date of Patent: Sep. 3, 2002

(54) SYNCHRONIZER

(75) Inventors: Graeme Andrew Jackson, Bolton; Carl Christopher John Smith, Chorley, both of (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/780,666

(22) Filed: Dec. 8, 2000

(30) Foreign Application Priority Data

Dec. 8, 1999 (GB) .............................................. 9928892

(51) Int. Cl.$^7$ ............................................. F16D 23/06
(52) U.S. Cl. ............................... 192/53.31; 192/53.34; 192/48.91
(58) Field of Search ........................... 192/48.91, 53.31, 192/53.34, 53.36; 74/339

(56) References Cited

U.S. PATENT DOCUMENTS

| 4,289,223 | A |   | 9/1981  | Strehler et al. | 192/48.91 |
|-----------|---|---|---------|-----------------|-----------|
| 5,078,245 | A |   | 1/1992  | Nellums et al.  | 192/53 E  |
| 5,425,437 | A | * | 6/1995  | Nellums         | 192/53.3  |
| 5,507,376 | A | * | 4/1996  | Skotnicki       | 192/48.91 |
| 5,544,727 | A |   | 8/1996  | Braun           | 192/48.91 |
| 5,664,654 | A | * | 9/1997  | Braun           | 192/48.91 |
| 5,678,670 | A |   | 10/1997 | Olsson          | 192/53.32 |
| 5,937,982 | A | * | 8/1999  | Olson et al.    | 192/53.31 |
| 5,957,257 | A | * | 9/1999  | Nellums         | 192/53.31 |

FOREIGN PATENT DOCUMENTS

| EP | 0663541    |   | 7/1995 | .......... F16D/23/06 |
| EP | 1099870 A2 | * | 5/2001 | .......... F16D/23/06 |
| IT | 0554047    |   | 1/1957 |                       |

* cited by examiner

*Primary Examiner*—Richard M. Lorence
(74) *Attorney, Agent, or Firm*—Kevin M. Hinman

(57) ABSTRACT

A baulkring-type synchronizer (18) includes cone clutch friction surfaces (24,48 and 26,50) and jaw clutch teeth (36*b*, 28 and 36*c*, 30) for frictionally synchronizing and positive connecting gears (14,16) to a shaft (12). A plurality of rigid members (72) is drivingly interposed between blocker teeth (44,46) affixed to baulkrings (40,42) and self-energizing ramp surfaces (71*a*, 71*b*, 73*a*, 73*b*) on self-energizing members (70,72) mounted on an outer circumference of a hub 32 affixed to the shaft (12). A shift sleeve (34) is slidably splined to the hub (32) and is moved by an operator shift: force ($F_o$) and an additive force ($F_a$) provided by the self-energizing ramp surfaces. Both forces ($F_o$ and $F_a$) react against the blocker teeth to engage the friction surfaces. The self-energizing members (70,72) are slidable relative to the hub and are axially centered resiliently on the hub by detent assemblies (76,78).

19 Claims, 3 Drawing Sheets

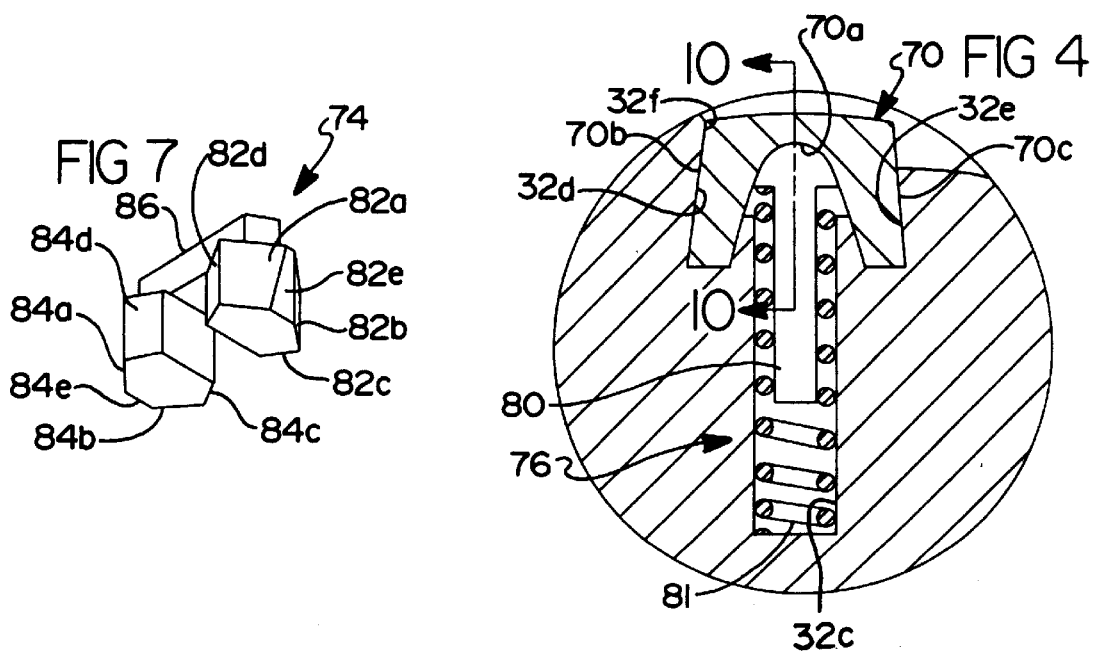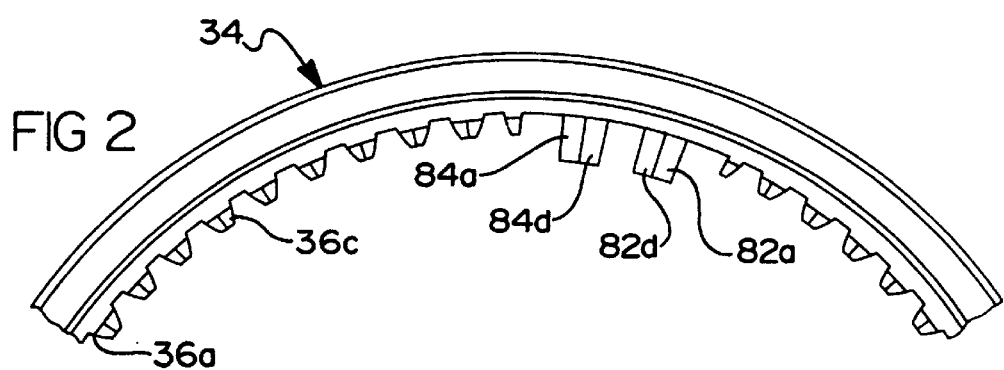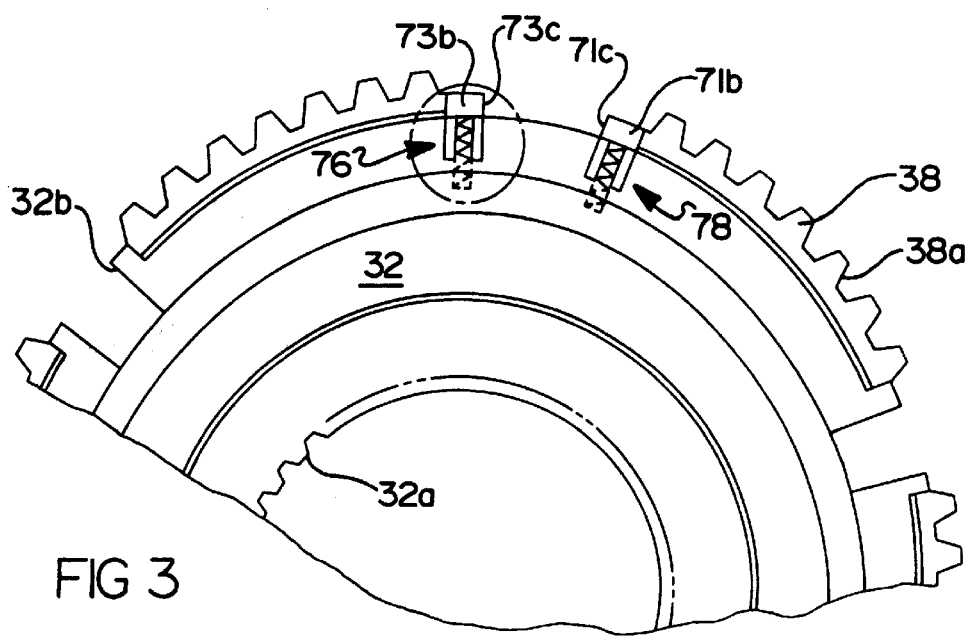

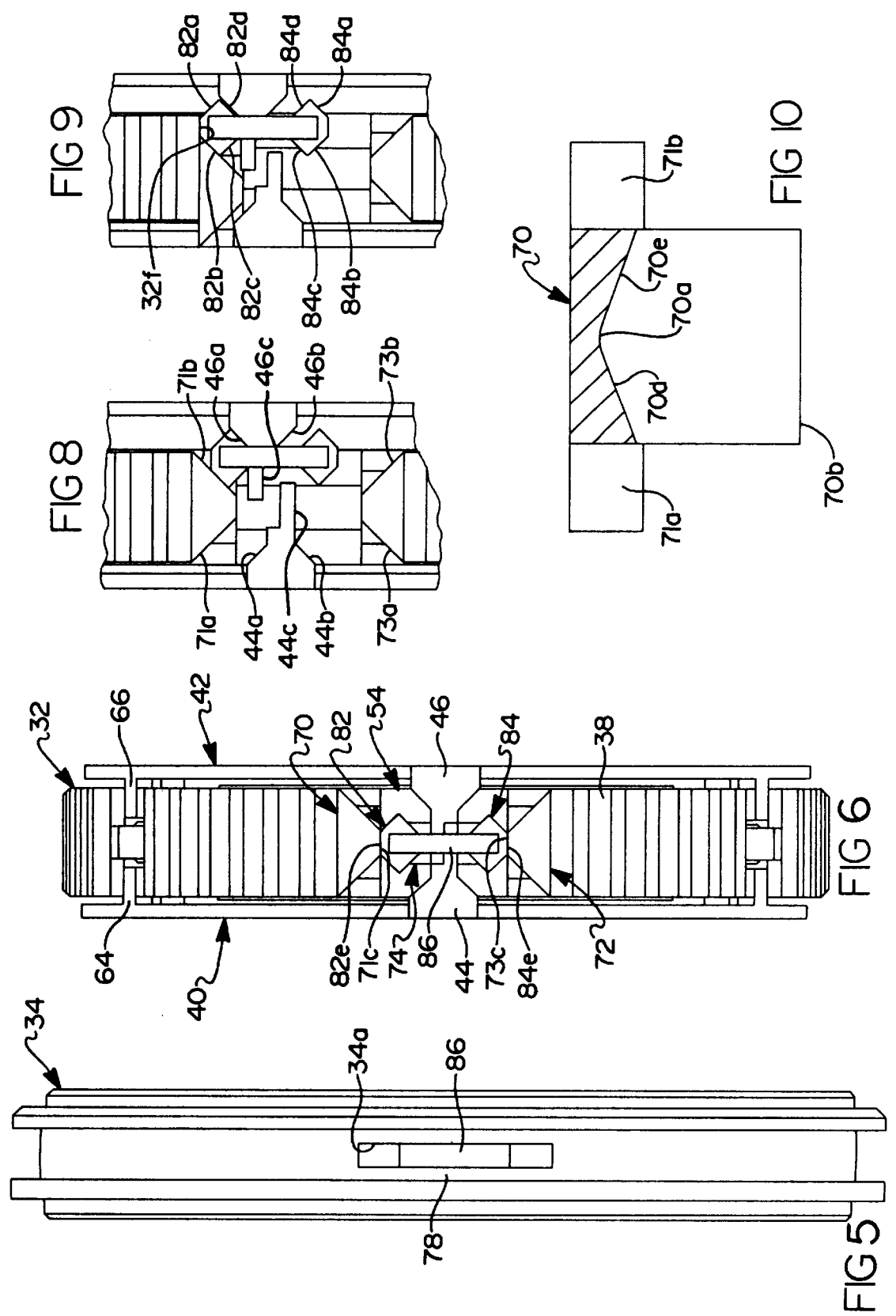

SYNCHRONIZER

FIELD OF THE INVENTION

This invention relates to a synchronizer having self-energizing and means to limit force provided by the self-energizing means.

BACKGROUND OF THE INVENTION

Synchronizers for use in multi-ratio transmissions are well known. Such synchronizers include pairs of friction and jaw members for respectively synchronizing and positively clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulkring having blocker teeth for arresting engaging movement of the shift sleeve until synchronization is reached and for transferring a shift force from the sleeve to increase the engaging force of the friction members.

It is also known that such synchronizers may be used to reduce shift time and shift effort required by a vehicle operator by providing the synchronizers with self-energizing means and that springs may be used to limit forces provided by the self-energizing means. U.S. Pat. No. 5,678,670 discloses a synchronizer having all of the above features and U.S. Pat. No. 5,544,727 discloses all but the spring regulating feature.

SUMMARY OF THE INVENTION

An object of this invention is to provide a synchronizer with self-energizing and improved force limiting of the self-energizing.

The invention relates to a synchronizer frictionally synchronizes and positively connects first and second drives disposed for relative rotation about a common axis, and the synchronizer comprises: A first element affixed against rotation and axial movement relative to the first drive and has an annular periphery with external splines. A second element includes an annular periphery with internal splines defining first jaw means and axially movable from a neutral position to an engaged position with second jaw means for positively connecting the drives in response to engaging movement of the second element by an axially directed first shift force ($F_o$). The second element includes internal splines mating continuously with the external splines in close slidable relation for preventing relative rotation therebetween. A first ring includes a first friction surface axially movable into engagement with a second friction surface in response to the engaging movement of the second element for producing a synchronizing torque ($T_o$). First and second pluralities of blocker surfaces are movable into engagement in response to the engaging movement of the second element for preventing asynchronous engagement of the jaw means and for transmitting the first shift force ($F_o$) to the first friction surface to effect an engagement force of the friction surfaces. The second plurality of blocker surfaces are affixed to the first ring. Pluralities of first and second self-energizing means respectively include first and second ramps operative when engaged to react the synchronizing torque for producing an additive axial force ($F_a$) in the direction of the first shift force ($F_o$) and for increasing the engagement force of the friction surfaces. One of the first and second self-energizing means includes means for directing the additive axial force ($F_a$) to the first friction surface via the blocker surfaces. Each of the first self-energizing means are mounted on one of the elements and each of the second self-energizing means are mounted for non-radial movement and limited rotation relative to another of the elements.

The improvement is characterized by resilient means for limiting the additive axial force to a predetermined amount. Each of the first self-energizing means including a member movably mounted on the one of the elements and defining one of the first self-energizing ramps. The member is movable against the resilient means in response to the additive axial force ($F_a$) exceeding the predetermined amount.

BRIEF DESCRIPTION OF THE DRAWINGS

The synchronizer of the invention is shown in the accompanying drawings in which:

FIGS. 2 and 3 are relief views of broken away portions of components in FIG. 1 looking axially relative to the shaft;

FIG. 4 is a vertical sectional view of a circled assembly in FIG. 3.

FIG. 5 is a relief view of a shift sleeve of the synchronizer in FIG. 1, and with components in FIGS. 5 and 6 rotated 60 degrees relative to FIG. 1;

FIG. 6 is the assembled components of FIG. 1 in the neutral position with the shift sleeve of FIG. 5 removed;

FIG. 7 is a perspective view of a self-energizing member in FIGS. 1 and 6.

FIGS. 8 and 9 are partial views of FIG. 6 with components therein in two different engaged positions; and FIG. 10 is a sectional view of a self-energizing member in FIG. 4 looking along line a—a.

DETAILED DESCRIPTION OF THE DRAWINGS

Figure 1:
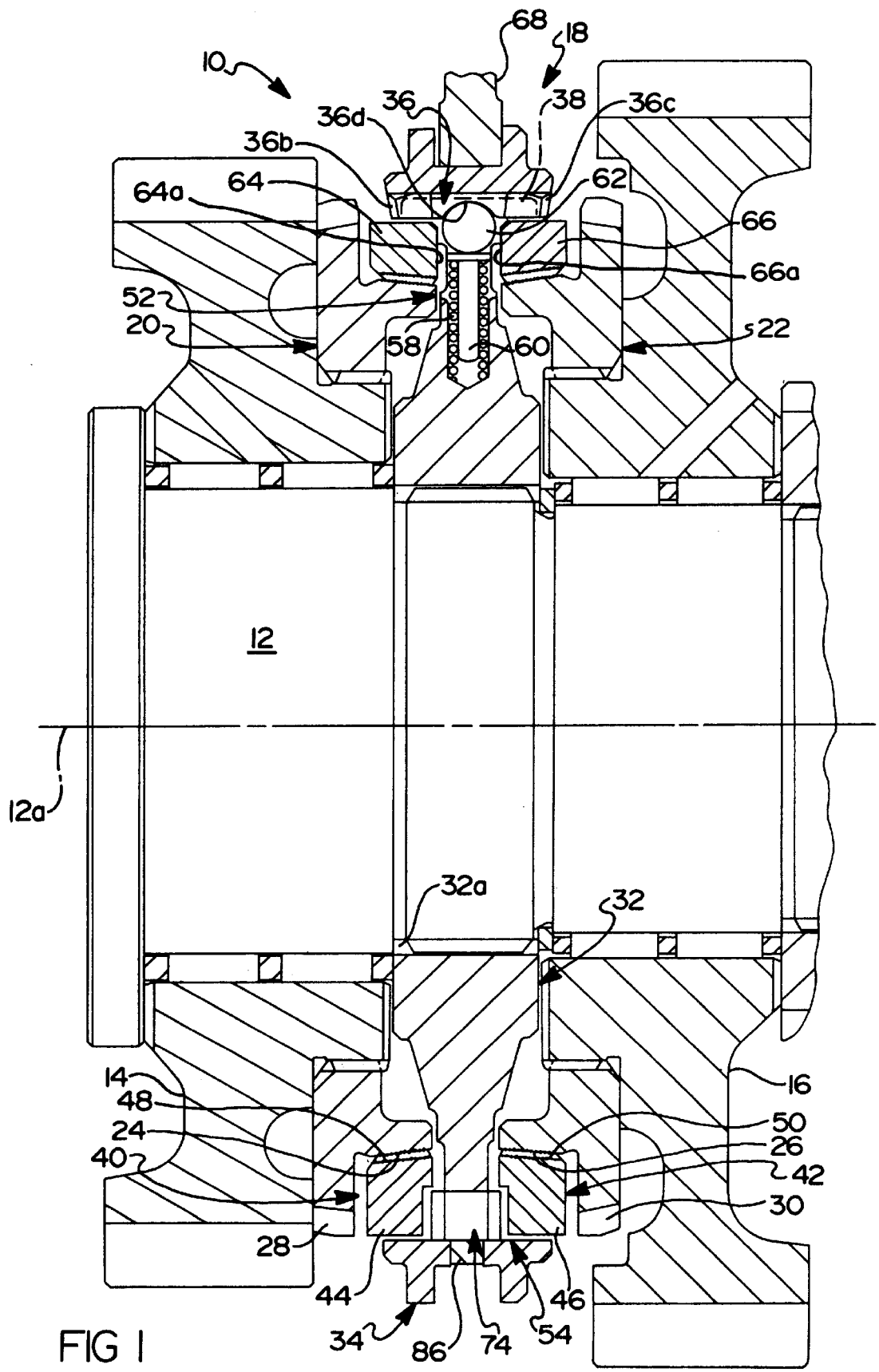
FIG. 1 is a sectional view of a double-acting baulkring-type synchronizer in a neutral position and disposed for rotation about the axis of a shaft.

The term "synchronizer" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer which includes ramps or cams or the like to increase the-engaging force of the synchronizing proportion to the synchronizing torque of the friction clutch.

Looking now at FIGS. 1–10, therein is shown a gear and synchronizer assembly 10 which forms part of a multi-ratio change speed transmission. Assembly 10 includes a shaft 12 mounted for rotation about a central axis 12a, axially spaced apart gears 14, 16 supported on the shaft for rotation relative thereto and secured against axial movement relative to the shaft in known manner, and a double-acting synchronizer 18.

The synchronizer 18 includes annular members 20, 22 axially and rotatably affixed to gears 14, 16 in known manner, gear friction surfaces 24, 26 herein integral with members 20,22, gear jaw teeth 28, 30 herein integral with members 20, 22, a hub member 32 axially and rotatably affixed at a central opening 32a thereof to shaft 12, a shift sleeve 34, internal spline teeth 36 defined on a central opening of sleeve 34 and in constant mesh with external spline teeth 38 defined on the outer circumference of hub 32, baulkrings 40, 42, blocker teeth sets 44, 46 and friction surfaces 48, 50 herein integral with baulkrings 40, 42, pre-energizer assemblies 52, and a self-energizing/blocker assembly 54. Herein,.the synchronizer includes three circumferentially spaced apart self-energizing/blocker assemblies 54 which cooperate with a like number of blocker teeth on each baulkring, and three circumferentially spaced apart pre-energizer assemblies. Each blocker tooth 44, 46 respectively includes angled blocker surfaces 44a,44b,46a,46b.

As is readily seen, friction surfaces 24, 48 and 26, 50 pair up to define friction clutches for synchronizing the gears to the shaft prior to engagement of the jaw clutch members. Cone clutches are preferred; however, other types of friction clutches may be used. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used.

Spline teeth 36, 38 have axially extending flank surfaces 36a,38a which continuously mate in close sliding relation so that there is relatively no free play between shift sleeve 34 and shaft 12. Opposite ends of splines 36 define jaw teeth 36b,36c which respectively mate with gear teeth 28, 30 to positive clutch the gears to the shaft. The flank sides of jaw teeth 36b,36c and of gear jaw teeth 28, 30 may be provided with an antibackout or a locking angle feature to prevent inadvertent disengagement of the teeth. Details of this feature may be seen by reference to U.S. Pat. No. 4,727,968.

Each pre-energizer assembly 52 includes a helical compression spring 58 and plunger 60 disposed in a radially extending blind bore in hub 32 and biasing a roller or ball 62 (herein a roller) into an annular detent groove 36d in shift sleeve splines 36. Pre energizer assembly 52 resiliently positions shift sleeve 34 in the neutral position shown in FIG. 1. Rollers 62 are axially spaced between abutment surfaces 64a, 66a defined by a plurality of tabs 64, 66 (herein three) formed integral with baulkrings 40, 42. The tabs extend into recesses 32b in hub 32 for limiting rotation of the baulkring relative to the hub and shaft.

When it is desired to couple either gear to the shaft, an appropriate and unshown shift mechanism, such as disclosed in U.S. Pat. No. 4,920,815, moves shift sleeve 34 axially via a partially shown shift fork 68 along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, pre-energizer assemblies apply a pre-energizer force proportional to the force applied by the operator to the shift sleeve. Whether manually or automatically applied, the force is applied to the shift sleeve in an axial direction and is proportional to a shift force hereinafter referred to as an operator shift force $F_o$. The pre-energizer force, depending on direction of shift sleeve movement by the shift force ($F_o$), moves either friction surface 48 or 50 into initial engagement with its associated friction surface to clock the associated baulkring to a position relative to hub 32 for positioning the self-energizing/blocker assemblies 54 in a manner explained hereinafter.

The self-energizing/blocker assemblies 54 each include self-energizing members 70, 72, the blocker teeth 44, 46, a rigid self-energizing/blocker member 74 which reacts self-energizing and blocker forces, and detent assemblies 76, 78 respectively biasing members 70, 72 to the positions of FIG. 6. Assemblies 76, 78 are identical; hence, only assemble 76 is described in detail. Assembly 76 includes a round headed detent member 80 biased into a detent groove 70a in member 70 by a compression spring 81 disposed in a blind bore 32c in the hub. Member 70 is slidably disposed in a slot having axially extending sidewalls 32d, 32e that diverge as they extend radially inward for slidably embracing like diverging sidewalls 70b, 70c of member 70. The sidewalls prevent radially outward movement of member 70. Detent groove 70a include detent ramps 70d, 70e which prevent axial movement of member 70 until axial forces acting on self-energizing or boost ramps 71a, 71b of member 70 exceed a predetermined centering force provided by spring 81, and the curved centering surface defined by groove 70a and detent ramps 70d, 70e. To prevent interference of member 70 sidewalls with baulkrings 40, 42, when member 70 moves axially as seen in FIG. 9, portions of axial ends of sidewalls 70b, 70c are removed in a manner seen in FIG. 10 for sidewall 70b.

Rigid member 74 includes circumferentially spaced apart end portions 82, 84 rigidly 15 secured together by a circumferentially extending portion 86 received in a circumferentially extending slot 34a in shift sleeve 34. Slot 34a allows limited circumferential movement of member 74 therein relative to the sleeve and prevents axial movement herein relative to the sleeve. End portion 82 includes self-energizing ramp surfaces 82a, 82b which respectively react against self-energizing ramp surfaces 71a, 71b when shift sleeve 34 is moved axially left or right and blocker surfaces 82c, 82d which respectively react against blocker surfaces 44a, 46a of blocker teeth 44, 46. In a like manner, end portion 84 includes self-energizing ramp surfaces 84a, 84b for respectively reacting against self-energizing ramp surfaces 73a, 73b and blocker surfaces 84c, 84d which respectively react against blocker surfaces 44b, 46b. Non-self-energizing ramp surfaces 82e, 84e respectively react against surfaces 71c, 73c when the synchronizer is in the neutral position of FIGS. 1 and 6. The engaged position of the non-self-energizing surfaces prevents unwanted activation of the self-energizing ramp surfaces in the event there is some amount of torque produced by one of the cone clutches, e.g., viscous shear of oil between the cone clutch friction surfaces may produce a torque that could otherwise activate the ramps.

Function of self-energizing/blocker assemblies 76 is described relative to FIGS. 1 and 6–9. The description assumes an asynchronous condition in one direction exists between shaft 12 and gear 16. When the blocker and self-energizing ramp surfaces are engaged as shown in FIG. 8 friction surfaces 50, 26 are also engaged. Axial extensions 44c, 46c of blocker teeth 44, 46 keep the blocker teeth circumferentially positioned between end portions 82, 84. Asynchronous conditions in the other direction or for gear 14 produce surface engagements that should be obvious from the following description. FIG. 6 illustrates a "neutral position" of all synchronizer components. Initial rightward axial movement of shift sleeve 34 by the operator shift force $F_o$ is transmitted by pre-energizer rollers 62 to baulkring 42 via tab abutment surfaces 66a to effect initial frictional engagement of movable cone surface 50 with gear cone surface 26, thereby producing an initial synchronizing torque for rotating blocker surfaces 46a to positions ensuring contact with blocker surfaces 82d. The initial rightward movement also moves rigid member 74 enough for non-self-energizing ramp surfaces 71c, 82e to axially disengage and allow the initial synchronizing torque to engage blocker surfaces 82b, 46a, as seen in FIG. 8. The initial engagement force of the cone surface is, of course, a function of the force of spring 58 and the angles of the walls of detent grooves 36d. In the "blocking/self-energizing position" of FIG. 8, the torque has rotated baulkring 42 and rigid members 74 enough to also engage self-energizing ramp surfaces 71b, 82b. Hence, in FIG. 8 surfaces 82d, 82b are trapped between baulkring blocker surfaces 46a and self-energizing ramp surfaces 71b. When these surfaces are so trapped and ignoring the effect of the engaged self-energizing ramp surfaces 82b, 71b, full operator shift force $F_o$ applied to rigid member 74 from shift sleeve 34 is transmitted across blocker surfaces 82d, 46a, thereby engaging friction surfaces 26, 50 with the operator shift force $F_o$ for producing a synchronizing torque $T_o$ proportional to the operator shift force $F_o$. Since blocker surfaces 82d, 46a are oblique to the plane of rotation, they in addition to preventing asynchronous engagement of jaw teeth 36a, 30 and transmitting the shift force $F_o$ to friction surfaces 26, 50, also produce a counter torque or unblocking torque counter to the synchronizing torque but of lesser magnitude during asynchronous conditions. As substantial synchronism is reached, the synchronizing torque drops below the unblocking torque, whereby the blocker teeth move out of engagement to allow continued axial movement of the shift sleeve and engagement of movable jaw teeth 36c with gear jaw teeth 30.

Looking now at the affects of the self-energizing ramp surfaces and the detent assemblies 76, the synchronizing torque $T_o$ due to the operator applied axial shift force $F_o$ is, of course, reacted across the self-energizing ramp surfaces, which surfaces produce an axial force component or axial additive force $F_a$ acting on the end portion 82 in the same direction as operator shift force $F_o$. This additive force $F_a$ is also transmitted across the blocker surfaces, thereby further increasing the engaging force of the friction surfaces to provide an additive synchronizing torque $T_a$ which adds to the torque $T_o$.

In the event that the self-energizing additive axial force $F_a$ exceeds a predetermined amount, as determined by detent assemblies 76, member 70 will move leftward, as shown in FIG. 9, and allow non-self-energizing surfaces 82e to move into balance positions. When in the balance positions, self-energizing ramp surfaces 82b, 71b are engaged and non-self-energizing surfaces 82e engage axially extending surface portions 32f of sidewall 32d in hub 32 which do not produce an axial additive force component. When in this position, the maximum additive force $F_a$ is limited to the force reacted by the detent assemblies 76 at the balance position since any synchronizing torque increase will be reacted by the non-self-energizing surfaces 82c, 32f.

The predetermined amounted of axial force provided by the detent assemblies 76, 78 may be different for gears 14, 16 and for up and down shifts by varying the angles of the detent ramps 70d, 70e in each of members 70, 72.

A synchronizer with self-energizing has been disclosed. The following claims are intended to cover the inventive portions of the disclosed synchronizer.

What is claimed is:

1. A synchronizer for frictionally synchronizing and positively connecting first and second drives disposed for relative rotation about a common axis; the synchronizer comprising:

a first element affixed against rotation and axial movement relative to the first drive and having an annular periphery with external splines;

a second element including an annular periphery with internal splines defining first jaw means and axially movable from a neutral position to an engaged position with second jaw means for positively connecting the drives in response to engaging movement of the second element by an axially directed first shift force ($F_o$), the second element internal splines mating continuously with the external splines in close slidable relation for preventing relative rotation therebetween;

a first ring including a first friction surface axially movable into engagement with a second friction surface in response to the engaging movement of the second element for producing a synchronizing torque ($T_o$);

first and second pluralities of blocker surfaces movable into engagement in response to the engaging movement of the second element and an asynchronous rotation between the first and second drives in one direction for preventing asynchronous engagement of the jaw means and for transmitting the first shift force ($F_o$) to the first friction surface to effect an engagement force of the friction surfaces, the second plurality of blocker surfaces affixed to the first ring;

pluralities of first and second self-energizing means respectively including first and second ramps operative when engaged to react the synchronizing torque for producing an additive axial force ($F_a$) in the direction of the first shift force ($F_o$) and for increasing the engagement force of the friction surfaces, one of the first and second self-energizing means including means for directing the additive axial force ($F_a$) to the first friction surface via the blocker surfaces, each first self-energizing means mounted on one of the elements, and each second self-energizing means mounted for non-radial movement and limited rotation relative to another of the elements; characterized by:

resilient means for limiting the additive axial force to a first predetermined amount; and each first self-energizing means including a first member movably mounted on the one of the elements and defining one of the first self-energizing ramps, and the first member movable against the resilient means in response to the additive axial force ($F_a$) exceeding the first predetermined amount.

2. The synchronizer of claim 1, wherein:

the periphery of the first element including axially extending first recesses each slidably receiving one of the first members for axial movement against the resilient means from a first position in a direction opposite the shift force ($F_o$) applied to the second element in response to the additive axial force ($F_a$) produced by the engaged ramps exceeding the predetermined amount in the direction of the shift force ($F_o$) applied to the second element.

3. The synchronizer of claim 2, wherein:

a radially inward facing surface of each first member includes a curved centering surface acted on by the resilient means for positioning the first member in the first position and operative to move the resilient means radially inward in response to the additive axial force ($F_a$) exceeding the first predetermined amount.

4. The synchronizer of claim 3, further including:

fifth and sixth pluralities of blocker surfaces movable into engagement in response to the engaging movement of the second element and an asynchronous rotation between the first and second drives in a direction opposite the one direction for preventing asynchronous engagement of the jaw means and for transmitting the first shift force ($F_o$) to the first friction surface to effect an engagement force of the friction surfaces, the sixth plurality of blocker surfaces affixed to the first ring;

pluralities of third and fourth self-energizing means respectively including fifth and sixth ramps operative when engaged to react the synchronizing torque for producing a third additive axial force ($F_a$) in the direction of the first shift force ($F_o$) and for increasing the engagement force of the friction surfaces, one of the third and fourth self-energizing means including means for directing the third additive axial force ($F_a$) to the first friction surface via the fifth and sixth pluralities of blocker surfaces, each third self-energizing means mounted on one of the elements, and each fourth self-energizing means mounted for non-radial movement and limited rotation relative to another of the elements;

second resilient means for limiting the additive axial force of third and fourth self-energizing means to a third predetermined amount; and each third self-energizing means including a second member movably mounted on the one of the elements at a position circumferentially spaced from the first member and defining one of the fifth self-energizing ramps, the second member movable against the resilient means in response to the third additive axial force ($F_a$) exceeding the third predetermined amount, and a circumferentially extending member rigidly securing the second and fourth self-energizing means together circumferentially between the first and second members.

5. The synchronizer of claim 4, wherein:

the periphery of the first element including axially extending second recesses each slidably receiving one of the second members for axial movement against the second resilient means from a first position in a direction opposite the shift force ($F_o$) applied to the second element in response to the third additive axial force ($F_a$) produced by the engaged ramps exceeding the third predetermined amount in the direction of the shift force ($F_o$) applied to the second element.

6. The synchronizer of claim 5, wherein:

a radially inwardly facing surface of each second member includes a curved centering surface acted on by the resilient means for positioning the second members in the first positions and operative to move the resilient means radially inwardly in response to the additive axial forces ($F_a$) exceeding the third predetermined amount.

7. The synchronizer of claim 6, wherein:

the first element is a hub, the second element is a shift sleeve, the first ring is a baulkring having the second pluralities of blocker surfaces affixed thereto, the second self-energizing means includes the means for directing the additive axial force ($F_a$) to the first friction surface via the blocker surfaces, the first self-energizing means are mounted on the hub, and the second self-energizing means are mounted for non-radial movement and non-axial movement relative to the shift sleeve and for limited rotation relative to the shift sleeve.

8. The synchronizer of claim 1, further including:

a third drive disposed for rotation about the common axis relative to the first and second drives and axially spaced from the second drive;

the second element internal splines defining third jaw means axially movable from a neutral position to an engaged position with fourth jaw means for positively connecting the first and third drives in response to engaging movement of the second element by an axially directed second shift force ($F_o$);

a second ring including a third friction surface axially movable into engagement with a fourth friction surface in response to the engaging movement of the second element by the second shift force ($F_o$) for producing a synchronizing torque ($T_o$);

third and fourth pluralities of blocker surfaces movable into engagement in response to the engaging movement of the second element by the second shift force ($F_o$) for preventing asynchronous engagement of the third and fourth jaw means and for transmitting the second shift force ($F_o$) to the third friction surface to effect an engagement force of the third and fourth friction surfaces, the fourth plurality of blocker surfaces affixed to the second ring;

the pluralities of first and second self-energizing means respectively including third and fourth ramps operative when engaged to react the synchronizing torque for producing a second additive axial force ($F_a$) in the direction of the second shift force ($F_o$) and for increasing the engagement force of the third and fourth friction surfaces, one of the first and second self-energizing means including means for directing the second additive axial force ($F_a$) to the third friction surface via the third and fourth blocker surfaces, and each first member defining one of the third self-energizing ramps and the first member movable against the resilient means in response to the second additive axial force ($F_a$) exceeding a second predetermined amount.

9. The synchronizer of claim 8, wherein:

the periphery of the first element including axially extending recesses each slidably receiving one of the first members for axial movement against the resilient means from a first position in a direction opposite the shift force ($F_o$) applied to the second element in response to the additive axial force ($F_a$) produced by the engaged ramps exceeding either of the first and second predetermined amount in the direction of the shift force ($F_o$) applied to the second element.

10. The synchronizer of claim 9, wherein:

a radially inward facing surface of each first member includes a curved centering surface acted on by the resilient means for positioning the first member in the first position and operative to move the resilient means radially inward in response to the additive axial force ($F_a$) exceeding the either of the first and second predetermined amount.

11. The synchronizer of claim 10, further including:

fifth and sixth pluralities of blocker surfaces movable into engagement in response to the engaging movement of the second element and an asynchronous rotation between the first and second drives in a direction opposite the one direction for preventing asynchronous engagement of the jaw means and for transmitting the first shift force ($F_o$) to the first friction surface to effect an engagement force of the friction surfaces, the sixth plurality of blocker surfaces affixed to the first ring;

pluralities of third and fourth self-energizing means respectively including fifth and sixth ramps operative when engaged to react the synchronizing torque for producing a third additive axial force ($F_a$) in the direction of the first shift force ($F_o$) and for increasing the engagement force of the friction surfaces, one of the third and fourth self-energizing means including means for directing the third additive axial force ($F_a$) to the first friction surface via the fifth and sixth pluralities of blocker surfaces, each third self-energizing means mounted on one of the elements, and each fourth self-energizing means mounted for non-radial movement and limited rotation relative to another of the elements;

second resilient means for limiting the additive axial force of the third and fourth self-energizing means to a third predetermined amount; and each third self-energizing means including a second member movably mounted on the one of the elements at a position circumferentially spaced from the first member and defining one of the fifth self-energizing ramps, the second member movable against the resilient means in response to the third additive axial force ($F_a$) exceeding the third predetermined amount, and a circumferentially extending member rigidly securing the second and fourth self-energizing means together circumferentially between the first and second members.

12. The synchronizer of claim 10, further including:

seventh and eighth pluralities of blocker surfaces movable into engagement in response to the engaging movement of the second element by the second shift force ($F_o$) for preventing asynchronous engagement of the third and fourth jaw means and for transmitting the second shift force ($F_o$) to the third friction surface to effect an engagement force of the third and fourth friction surfaces, the eighth plurality of blocker surfaces affixed to the second ring; and the pluralities of third and fourth self-energizing means respectively including seventh and eighth ramps operative when engaged to react the synchronizing torque for producing a fourth additive axial force ($F_a$) in the direction of the second shift force ($F_o$) and for increasing the engagement force of the third and fourth friction surfaces, one of the third and fourth self-energizing means including means for directing the fourth additive axial force ($F_a$) to the third friction surface via the seventh and eighth blocker surfaces, and each second member defining one of the seventh self-energizing ramps and the second member movable against the second resilient means in response to the fourth additive axial force ($F_a$) exceeding a fourth predetermined amount.

13. The synchronizer of claim 12, wherein:

the periphery of the first element including axially extending second recesses each slidably receiving one of the second members for axial movement against the second resilient means from a first position in a direction opposite the shift force ($F_o$) applied to the second element in response to the fourth additive axial force ($F_a$) produced by the engaged ramps exceeding the fourth predetermined amount in the direction of the shift force ($F_o$) applied to the second element.

14. The synchronizer of claim 13, wherein:

a radially inwardly facing surface of each second member includes a curved centering surface acted on by the second resilient means for positioning the second members in the first positions and operative to move the second resilient means radially inwardly in response to additive axial forces ($F_a$) exceeding either of the third and fourth predetermined amounts.

15. The synchronizer of claim 14, wherein:

the first element is a hub, the second element is a shift sleeve, the first and second rings are first and second, the second self-energizing means includes the means for directing the first and second additive axial force ($Fa$), the fourth self-energizing means includes the means for directing the third and fourth additive axial force ($Fa$), the first and third self-energizing means are mounted on the hub, and the second and fourth self-energizing means are mounted for non-radial movement and non-axial movement relative to the shift sleeve and for limited rotation relative to the shift sleeve.

16. A synchronizer for frictionally synchronizing and positively connecting first and second drives disposed for relative rotation about a common axis; the synchronizer comprising:

a first element affixed against rotation and axial movement relative to the first drive and having an annular periphery with external splines; a second element including an annular periphery with internal splines defining first jaw means and axially movable from a neutral position to an engaged position with second jaw means for positively connecting the drives in response to engaging movement of the second element by an axially directed first shift force ($F_o$), the second element including internal splines mating continuously with the external splines in close slidable relation for preventing relative rotation therebetween;

a first ring including a first friction surface axially movable into engagement with a second friction surface in response to the engaging movement of the second element for producing a synchronizing torque ($T_o$);

first and second pluralities of blocker surfaces movable into engagement in response to the engaging movement of the second element and an asynchronous rotation between the first and second drives in one direction for preventing asynchronous engagement of the jaw means and for transmitting the first shift force ($F_o$) to the first friction surface to effect an engagement force of the friction surfaces, the second plurality of blocker surfaces affixed to the first ring;

pluralities of first and second self-energizing means respectively including first and second ramps operative when engaged to react the synchronizing torque for producing an additive axial force ($F_a$) in the direction of the first shift force ($F_o$) and for increasing the engagement force of the friction surfaces, the second self-energizing means including means for directing the additive axial force ($F_a$) to the first friction surface via the blocker surfaces, each first self-energizing means mounted on the first element, and each second self-energizing means mounted for non-radial movement and limited rotation relative to the second element; characterized by:

resilient means for limiting the additive axial force to a first predetermined amount; and each first self-energizing means including a first member movably mounted on the first element and defining one of the first self-energizing ramps, and the first member movable against the resilient means in response to the additive axial force ($F_a$) exceeding the first predetermined amount.

17. The synchronizer of claim 16, further including:

a third drive disposed for rotation about the common axis relative to the first and second drives and axially spaced from the second drive;

the second element internal splines defining third jaw means axially movable from a neutral position to an engaged position with fourth jaw means for positively connecting the first and third drives in response to engaging movement of the second element by an axially directed second shift force ($F_o$);

a second ring including a third friction surface axially movable into engagement with a fourth friction surface in response to the engaging movement of the second element by the second shift force ($F_o$) for producing a synchronizing torque ($T_o$);

third and fourth pluralities of blocker surfaces movable into engagement in response to the engaging movement of the second element by the second shift force ($F_o$) for preventing asynchronous engagement of the third and fourth jaw means and for transmitting the second shift force ($F_o$) to the third friction surface to effect an engagement force of the third and fourth friction surfaces, the fourth plurality of blocker surfaces affixed to the second ring;

the pluralities of first and second self-energizing means respectively including third and fourth ramps operative when engaged to react the synchronizing torque for producing a second additive axial force ($F_a$) in the direction of the second shift force ($F_o$) and for increasing the engagement force of the third and fourth friction surfaces, the second self-energizing means including means for directing the second additive axial force ($F_a$) to the third friction surface via the third and fourth blocker surfaces, and each first member defining one of the third self-energizing ramps and the first member movable against the resilient means in response to the second additive axial force ($F_a$) exceeding a second predetermined amount.

18. A synchronizer for frictionally synchronizing and positively connecting first and second drives disposed for relative rotation about a common axis; the synchronizer comprising:

a hub affixed against rotation and axial movement relative to the first drive and having an annular periphery with external splines;

a shift sleeve including an annular periphery with internal splines defining first jaw means and axially movable from a neutral position to an engaged position with second jaw means for positively connecting the drives in response to engaging movement of the shift sleeve by an axially directed first shift force ($F_o$), the shift sleeve including internal splines mating continuously with the external splines in close slidable relation for preventing relative rotation therebetween;

a first ring including a first friction surface axially movable into engagement with a second friction surface in response to the engaging movement of the shift sleeve for producing a synchronizing torque ($T_o$);

first and second pluralities of blocker surfaces movable into engagement in response to the engaging movement of the shift sleeve and an asynchronous rotation between the first and second drives in one direction for preventing asynchronous engagement of the jaw means and for transmitting the first shift force ($F_o$) to the first friction surface to effect an engagement force of the friction surfaces, the second plurality of blocker surfaces affixed to the first ring;

pluralities of first and second self-energizing means respectively including first and second ramps operative when engaged to react the synchronizing torque for producing an additive axial force ($F_a$) in the direction of the first shift force ($F_o$) and for increasing the engagement force of the friction surfaces, the second self-energizing means including means for directing the additive axial force ($F_a$) to the first friction surface via the blocker surfaces, each first self-energizing means mounted on the hub, and each second self-energizing means mounted for non-radial movement and limited rotation relative to the shift sleeve; characterized by:

resilient means for limiting the additive axial force to a first predetermined amount; and each first self-energizing means including a first member movably mounted on the hub and defining one of the first self-energizing ramps, and the first member movable against the resilient means in response to the additive axial force ($F_a$) exceeding the first predetermined amount.

19. The synchronizer of claim 18, further including:

a third drive disposed for rotation about the common axis relative to the first and second drives and axially spaced from the second drive;

the shift sleeve internal splines defining third jaw means axially movable from a neutral position to an engaged position with fourth jaw means for positively connecting the first and third drives in response to engaging movement of the shift sleeve by an axially directed second shift force ($F_o$);

a second ring including a third friction surface axially movable into engagement with a fourth friction surface in response to the engaging movement of the shift sleeve by the second shift force ($F_o$) for producing a synchronizing torque ($T_o$);

third and fourth pluralities of blocker surfaces movable into engagement in response to the engaging movement of the shift sleeve by the second shift force ($F_o$) for preventing asynchronous engagement of the third and fourth jaw means and for transmitting the second shift force ($F_o$) to the third friction surface to effect an engagement force of the third and fourth friction surfaces, the fourth plurality of blocker surfaces affixed to the second ring;

the pluralities of first and second self-energizing means respectively including third and fourth ramps operative when engaged to react the synchronizing torque for producing a second additive axial force ($F_a$) in the direction of the second shift force ($F_o$) and for increasing the engagement force of the third and fourth friction surfaces, the second self-energizing means including means for directing the second additive axial force ($F_a$) to the third friction surface via the third and fourth blocker surfaces, and each first member defining one of the third self-energizing ramps and the first member movable against the resilient means in response to the second additive axial force ($F_a$) exceeding a second predetermined amount.

* * * * *